United States Patent [19]

Sakurai et al.

[11] 4,394,048
[45] Jul. 19, 1983

[54] INTERLOCKING MECHANISM OF BOTH SIDE LOCK RECLINER FOR AUTOMOTIVE SEAT

[75] Inventors: Kenji Sakurai, Toyota; Noboru Yoshimura, Chiryu, both of Japan

[73] Assignees: Toyota Jidosha Kogyo Kabushiki Kaisha; Aisin Seiki Kabushiki Kaisha, both of Aichi, Japan

[21] Appl. No.: 262,503

[22] Filed: May 11, 1981

[30] Foreign Application Priority Data

May 16, 1980 [JP] Japan .............................. 55/67107[U]

[51] Int. Cl.³ ............................................. A47C 1/026
[52] U.S. Cl. ..................................... 297/367; 297/379
[58] Field of Search ................................ 297/366–369, 297/354, 355, 363–365, 379

[56] References Cited

U.S. PATENT DOCUMENTS

| 4,103,964 | 8/1978 | Klingelhofer et al. | 297/367 |
| 4,218,092 | 8/1980 | Schacl et al. | 297/367 |
| 4,269,447 | 5/1981 | Dottori | 297/367 X |

FOREIGN PATENT DOCUMENTS 149986  5/1955  Sweden .............................. 297/366

*Primary Examiner*—William E. Lyddane
*Attorney, Agent, or Firm*—Parkhurst & Oliff

[57] ABSTRACT

An interlocking mechanism of both-side lock recliner for an automotive seat which has an interlocking mechanism for simultaneously controlling the lock and the release of right and left engaging mechanisms mounted at both sides of the seat and including right and left manipulating levers, auxiliary levers provided symmetrically at both sides of the seat, and an interlocking rod including hook formed at both ends thereof for engaging between the auxiliary levers of both sides. Thus, the interlocking mechanism can exactly transmit the manipulating force of the handle in the engaging portion between the interlocking rod end and the member engaged with the interlocking rod end without enhancing the dimensional accuracy.

4 Claims, 5 Drawing Figures

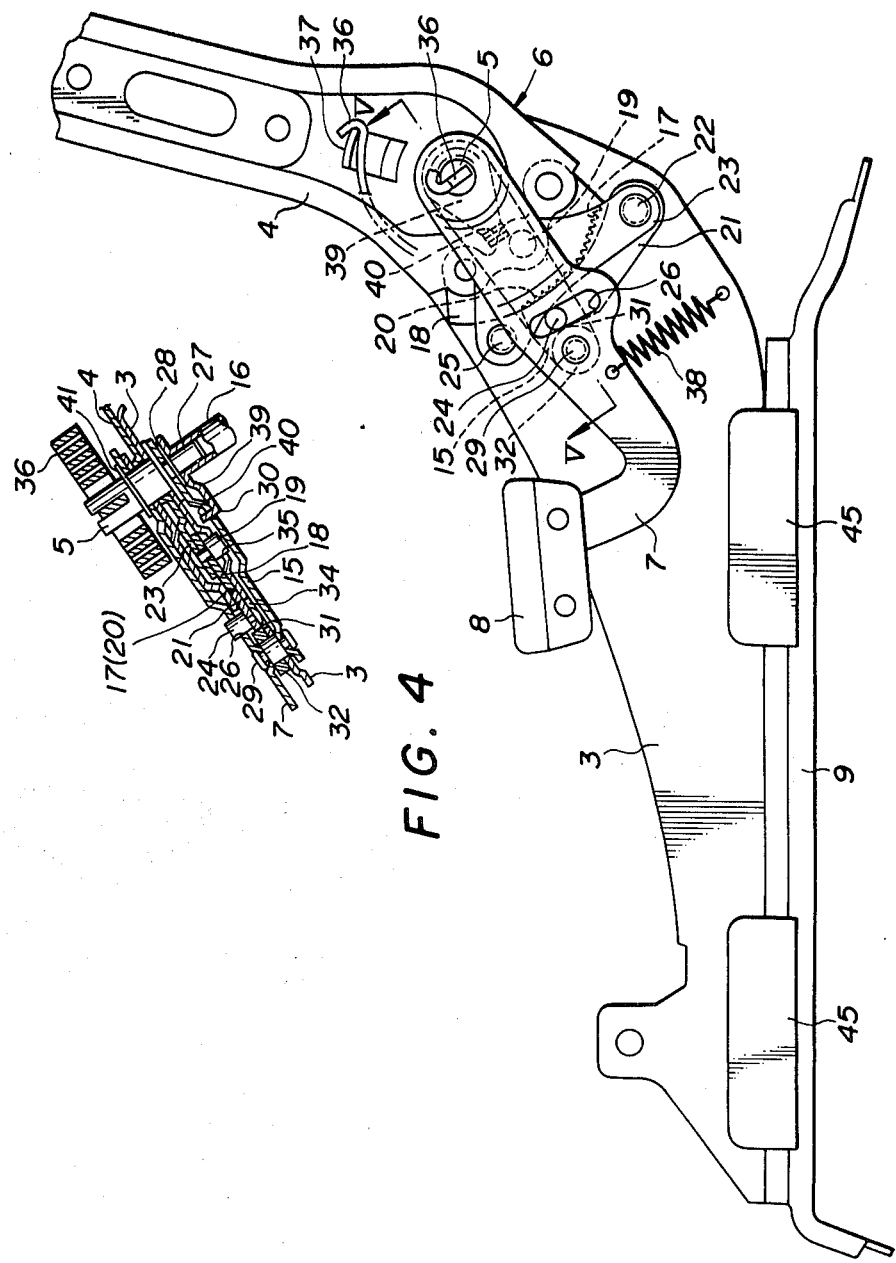

INTERLOCKING MECHANISM OF BOTH SIDE LOCK RECLINER FOR AUTOMOTIVE SEAT

BACKGROUND OF THE INVENTION

This invention relates to a lock recliner of a seat for a vehicle and, more particularly, to an interlocking mechanism of a both-side lock recliner for an automotive seat for simultaneously controlling the lock or the release of right and left side engaging mechanisms of the seat.

The conventional interlocking mechanism of a both-side lock recliner for an automotive seat has rotating force transmitting units provided at both sides of an interlocking rod for interlocking right and left side engaging mechanisms. The rotating force transmitting unit normally consists of right and left side interlocking rod ends of rectangular or sector-like cross section and members engaged with the right and left side interlocking rod ends. Since there is a gap at the engaging portion between the interlocking rod end and the member of the rotating force transmitting unit, a control stroke is not transmitted to a side to be transmitted as it is to thus cause the transmitting loss of the control stroke therebetween to adversely effect the tramsission of the rotating force therebetween. Accordingly, it is necessary to provide a longer control stroke at a manipulating handle in the conventional interlocking mechanism, and it is also required to strictly manage the engaging accuracy of the engaging portion between the interlocking rod end and the member of the rotating force transmitting unit.

Further, inasmuch as the manipulating force of the handle is transmitted to the engaging portion as a transmitting torque at the side to be transmitted due to the rotation of the handle in a manner of large surface pressure onto the narrow surface of the engaging portion between the interlocking rod end and the member of the rotating force transmitting unit, the surface of the engaging portion tends to be worn or to be deformed due to the transmitting torques repeatedly applied thereto to thus cause the increase in the gap therebetween in the engaging portion between the interlocking rod end and the member of the rotating force transmitting unit. Therefore, it is required to counter-measure the conventional interlocking mechanism against the wear or deformation of the engaging portion between the interlocking rod end and the member of the rotating force transmitting unit in such a manner that the surface of the engaging portion therebetween is increased in area or the material of the surface of the engaging portion is strictly selected.

In addition, as a result that the engaging accuracy of the engaging portion between the interlocking rod end and the member of the rotating force transmitting unit is improved, it must engage the engaging portion of the accurate interlocking rod therebetween very carefully in the step of assembling a seat assembly. Consequently, it is eagerly desired to provide a lock recliner which does not cause such wear or deformation at the surface of the engaging portion between the interlocking rod end and the member of the rotating force transmitting unit therein.

SUMMARY OF THE INVENTION

Therefore, an object of this invention is to provide an interlocking mechanism of a both-side lock recliner which can exactly transmit the manipulating force of the handle of the lock recliner in the engaging portion between the interlocking rod end and the member engaged with the interlocking rod end of the rotating force transmitting unit thereof without enhancing the dimensional accuracy thereof.

Another object of this invention is to provide an interlocking mechanism of a both-side lock recliner which does not wear nor deform the surface of the engaging portion between the interlocking rod end and the member engaged with the interlocking rod end of the rotating force transmitting unit thereof even if the surface of the engaging portion therebetween is not so increased in area.

Yet another object of this invention is to provide an interlocking mechanism of a both-side lock recliner which hardly causes the transmitting loss of the manipulating force at the engaging portion between the interlocking rod end and the member engaged with the interlocking rod end of the rotating force transmitting unit thereof even if there is slightly a large gap in the engaging portion therebetween.

A further object of this invention is to provide an interlocking mechanism of a both-side lock recliner which does not cause the transmitting loss of the manipulating force at the engaging portion between the interlocking rod end and the member engaged with the interlocking rod end of the rotaing force transmitting unit thereof even if components of low dimensional accuracy such as a hook, auxiliary lever, and the like produced by a press work are employed therefor.

Still another object of this invention is to provide an interlocking mechanism of a both-side recliner which can be readily assembled.

Still another object of the invention is to provide an interlocking mechanism of a both-side recliner which can be inexpensively fabricated.

BRIEF DESCRIPTION OF THE DRAWINGS

The foregoing objects and other objects as well as the characteristic features of the invention will become more apparent and more readily understandable by the following description and the appeded claims when read in conjunction with the accompanying drawings:

FIG. 4 is a side view of the both-side recliner shown in FIG. 3; and

FIG. 5 is a sectional view of the both-side lock recliner taken along the line V—V as designated by arrows in FIG. 4.

DESCRIPTION OF THE PREFERRED EMBODIMENTS

Figure 1:
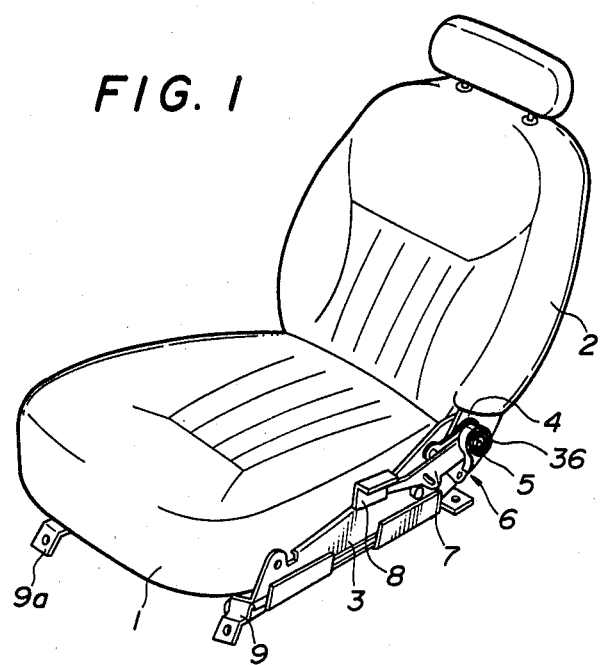
FIG. 1 is a perspective view of the external appearance of the automotive seat in which the interlocking mechanism of the both-side lock recliner constructed according to the present invention is mounted.

Referring now to the drawing, particularly to FIG. 1, showing the external appearance of the automotive seat in which the interlocking mechanism of the both-side lock recliner as one preferred embodiment of the present invention, wherein like reference numerals designate the same parts in the following views, a seat cushion 1 and a seat back 2 are integrally coupled to lower and upper arms 3 and 4, which are rotatably engaged with a hinge shaft 5 at an angle therebetween as arbitrarily selected by a crew sat on the seat by a recliner 6. The recliner 6 is locked or released by rotating a manipulating handle 8 engaged with a manipulating lever 7 around the hinge shaft 5.

The lower arm 3 can be moved longitudinally of an automotive body on lower rails 9.

Figure 3:
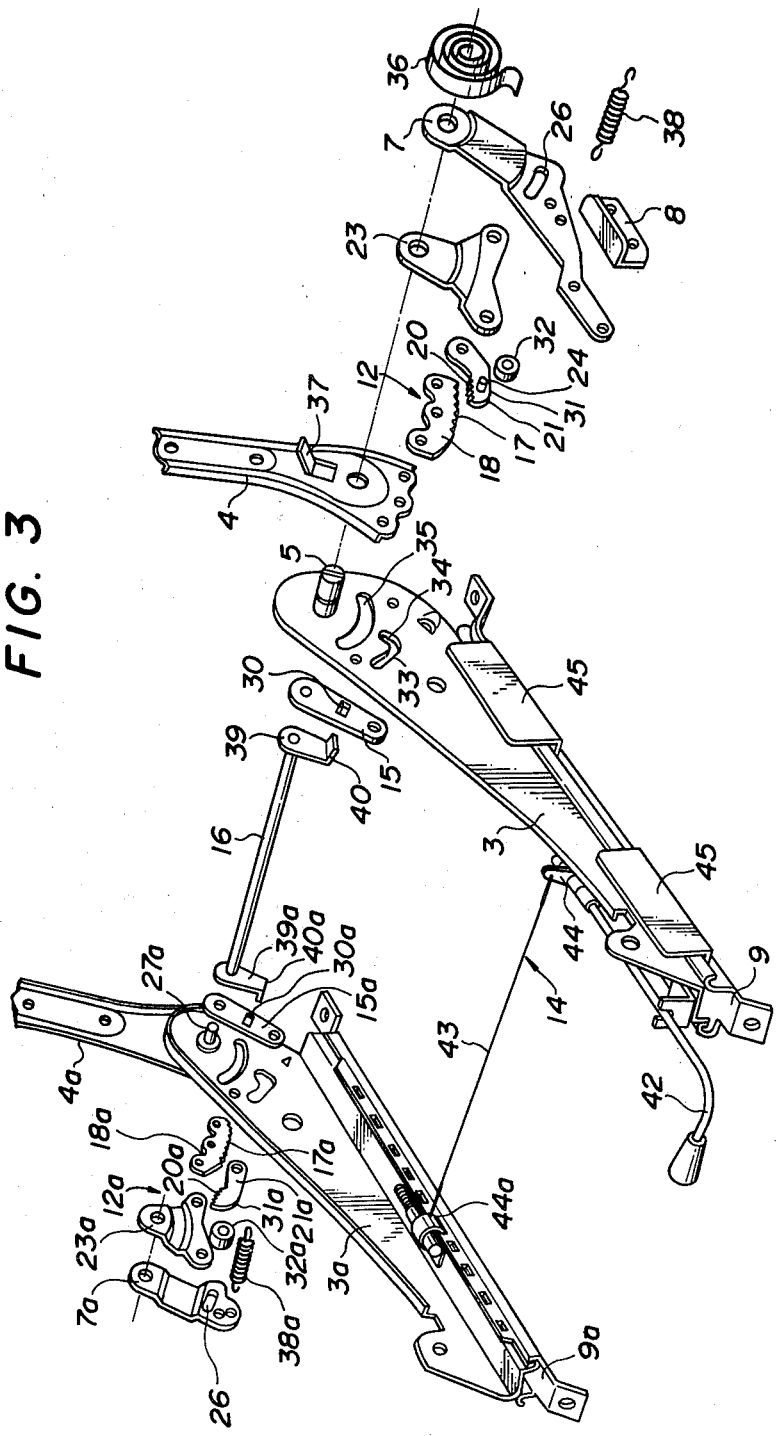
FIG. 3 is an exploded perspective view of the both-side lock recliner of one preferred embodiment of the present invention.

Reference is now made to FIG. 3, which shows the framework of the automotive seat in which the interlocking mechanism of the both-side lock recliner of the present invention by removing the seat cushion and the seat back from the seat as seen from the left side of the seat inside the seat (as seen from the central side of the compartment of a vehicle). There are designated a seat cushion frame 10 engaged with the lower arms 3, 3a for supporting the seat cushion 1, a seat back frame 11 engaged with the upper arms 4, 4a for supporting the seat back 2, left and right side engaging mechanisms 12, 12a, an interlocking mechanism 13 for interlocking both the left and right side engaging mechanisms 12, 12a, and a seat track operating mechanism 14 for longitudinally moving the seat. The interlocking mechanism 13 consists, as shown, of a left side manipulating lever 7 rockably engaged therewith, an auxiliary lever 15, an interlocking rod 16, a right side auxiliary lever 15a (in FIG. 3), and a right side manipulating lever 7a.

The component members of the interlocking mechanism of the both side lock recliner of this invention are almost symmetrically composed as a pair at both right and left sides of an automotive seat, and will be accordingly described with respect to the right side component members as attached with suffix "a" to the respective reference numerals of the right side members.

Figure 2:
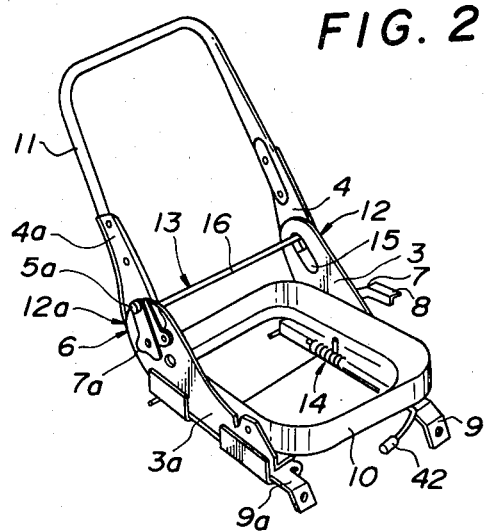
FIG. 2 is a perspective view of the framework of the automotive seat in which the interlocking mechanism of the both-side lock recliner of the invention is mounted.

Referring now to FIG. 3, which shows the exploded perspective view of the component parts of the lock recliner constructed according to the present invention, hinge shafts 5, 5a are projected toward the outside of the lock recliner from both the lower arms 3 and 3a, respectively disposed in a confronting manner at right and left sides for supporting the seat cushion frame 10 (FIG. 2) at both right and left sides, and the upper arms 4, 4a are rockably secured to the hinge shafts 5 and 5a, respectively. Latches 18, 18a having a number of arcuate teeth 17, 17a, respectively integrally formed therewith are so secured to the upper arms 4 and 4a, respectively that the center of the teeth 17 and 17a is coaxially engaged with that of the upper arms 4 and 4a, respectively. In the exemplified embodiment of the lock recliner of this invention in FIGS. 4 and 5, the latch 18 is fixedly secured to the upper arm 4 with three rivets 19.

Poles 21, 21a having toothed portions 20, 20a partly engaged with the toothed portions 17 and 17a, respectively of the latches 18 and 18a, respectively are rockably journaled with the lower arms 3 and 3a, respectively.

As shown in FIG. 4, the pole 21 is so journaled with the lower arm 3 that a pin 22 may become a rotating center. The pole 21a similarly journaled with the lower arm 3a to the pole 21.

It is noted that release pins 24, 24a engaged with the manipulation levers 7 and 7a, respectively to be described in greater detail hereinafter are projected from the poles 21 and 21a, respectively.

Cover plates 23, 23a are interposed at the outsides of the latches 18 and 18a, respectively and the poles 21 and 21a, respectively therebetween, and the levers 7, 7a are rockably secured to the hinge shafts 5 and 5a, respectively at the outside of the cover plates 23 and 23a, respectively, and stopper E ring 41 is mounted thereat.

The cover plates 23, 23a are inserted into the hinge shafts 5 and 5a, respectively and are also so fixedly secured to the lower arms 3 and 3a, respectively as to cover and interpose the engaging portions of toothed portions 17 and 17a, respectively of the rockable latches 18 and 18a, respectively and the toothed portions 20 and 20a, respectively of the poles 21 and 21a, respectively. The cover plate 23 is, as shown in FIG. 4, fixedly secured to the lower arm 3 with the pin 22 and a rivet 25, and the cover plate 23a is similarly fixedly secured to the lower arm 3a to the cover plate 23.

The manipulating lever 7 is so perforated with a long hole 26, as designated in FIG. 4, for slidably engaging the release pin 24 of the pole 21 as to serve upon disengagement of the toothed portions 17 and 20. Further, the manipulation handle 8 is mounted at the end of the lever 7. It is noted that though the manipulating handle is not mounted at the lever 7a, but the manipulating lever 7a is perforated similarly with a long hole 26a for slidably engaging the release pin 24a of the pole 21 to the lever 7.

Hinge shafts 27, 27a projected inside of the lower arms 3 and 3a, respectively are integrally extended from the hinge shafts 5 and 5a, respectively fixedly secured to the lower arms 3 and 3a, respectively (FIG. 3).

The auxiliary lever 15 is rockably secured, as illustrated in FIG. 5, to the hinge shaft 27, and is mounted with a stopper E ring 28 for the lever 15 in such a manner that the interlocking rod 16 is rockably secured at the end inside the E ring 28 of the hinge shaft 27, and the auxiliary lever 15a and the interlocking rod 16 are rockably secured similarly at the end to the hinge shaft 27a thereto.

It is so constructed that the auxiliary lever 15 is so connected at the end as to rotate integrally with the manipulating lever 7 through a penetrating pin 29 passing through the lower arm 3, is perforated with a hole 30 for engaging the end 40 of a hook 39 at the end of the interlocking rod 16 at the end portion thereof to interlock between the auxiliary lever 15 and the interlocking rod 16 upon engaging of the end 40 of the hook 39 with the hole 30 thereof. Further, a roller 32 capable of rolling on the cam surface 31 of the pole 21 is so interposed at the pin 29 as to be rotatably interposed between the lever 7 and the auxiliary lever 15. In the exemplified embodiment shown, the hole 30 is rectangular shape. Similarly, the auxiliary lever 15a is integrally pin-coupled to the lever 7a, the hole 30a is perforated at the end portion of the auxiliary lever 15, and the roller 32a is rockably interposed between the lever 7a and the auxiliary lever 15a.

The lower arm 3 is passed with the pin 29 therethrough, is perforated with an arcuate hole 33 for rotating itself around the hinge shaft 5 as a center, is perforated also with an arcuate hole 34 for not contacting the head of the release pin 24 rotating around the pin 22 as a center therewith, and is also perforated with an arcuate hole 35 for projecting and making sliding contact with the heads of rivets 19 rotating around the hinge shaft 5 as a center. The hole 35 is so perforated at the lower arm 3 as to be limited to the angular range capable of rotating the upper arm 4. In the exemplified embodiment shown, the arcuate holes 33 and 34 are continuously integrated. Similarly, the respective holes 33a, 34a, and 35a are perforated symmetrically to the holes 33, 34 and 35 at the lower arm 3a.

A spiral spring 36 is engaged at the inner end with the end of the hinge shaft 5, and is also engaged at the outer end with the hook 37 projected from the upper arm 4 for turning the seat back 2 forwardly.

It is noted that although only a spiral spring 36 is provided at the left side in the exemplified embodiment shown, it may also be provided at both sides.

Springs 38, 38a are provided under tension between the levers 7 and 7a, respectively and the lower arms 3 and 3a, respectively for so urging the levers 7 and 7a, respectively as to rotate the levers 7 and 7a, respectively counterclockwise in FIG. 4.

The interlocking rod 16 is normally made of a pipe material and is attached with hooks 39 and 39a at both ends thereof, and is so projected with hook ends 40 and 40a, respectively at the positions separate from the coaxial center of the interlocking rod 16 at the ends of the respective hooks 39 and 39a as to be engaged with the holes 30 and 30a, respectively of the auxiliary levers 15 and 15a, respectively.

As shown in FIG. 3, the lower arms 3, 3a are carried longitudinally movably on the lower rails 9 and 9a, respectively, and the seat track operating mechanism 14 for engaging and releasing therebetween consists of a manipulating lever 42 and left and right latches 44 and 44a operated simultaneously through an interlocking wire 43 by the lever 42. Reference numeral 45 designates a holding plate of the seat track.

The operation of the interlocking mechanism of the both-side lock recliner of this invention thus constructed will now be described.

As illustrated in FIG. 4, since the manipulating lever 7 is always urged counterclockwise by the spring 38, the roller 32 inserted to the pin 29 so urges the cam surface 31 of the pole 21 that the pole 21 rotates clockwise around the pin 22 as a center, and the toothed portion 20 of the pole 21 is accordingly engaged with the toothed portion 17 of the latch 18 to retain the upper arm 4 thereat. The release pin 34 of the pole 21 does not disturb the engagement of the lever 7 therewith in the long hole 26 at this position or is occupied at the position for aiding the engagement of the lever 7 therewith in the long hole 26 of the lever 27. The same operation is effected similarly in the engaging mechanism 12a at the right side.

In order to control the inclined angle of the seat back 2, the handle 8 is raised upwardly, and the lever 7 is then rocked clockwise around the hinge shaft 5 as a center in FIG. 4. Then, the roller 32 is disengaged from the cam surface 31 of the pole 21, while the release pin 24 is guided through the long hole 26, and the pole 21 is thus rotated counterclockwise around the pin 22 as a center to disengage the engagement of the toothed portion 20 of the pole 21 with the toothed portion 17 of the latch 18.

On the other hand, when the lever 7 is rocked, the auxiliary lever 15 is simultaneously rocked through the pin 29 around the hinge shaft 27 as a center. As the auxiliary lever 15 is thus rocked, the hook 39 engaged therewith is rocked at the end 40 and the interlocking rod 16 integral with the hook 39 is accordingly rocked. The rocking motion of the interlocking rod 16 is transmitted through the hook 39a, the end 40a of the hook 39a, and the auxiliary lever 15a to the manimulating lever 7a, and this motion accordingly disengages the engagement of the toothed portion 17a of the latch 18a with the toothed portion 20a of the pole 21a similarly to the above operation. As a result, the seat back 2 becomes rotatable or rackable around the hinge shafts 5 and 5a as a center.

The engagement of the interlocking rod 16 with the auxiliary levers 15 and 15a is effected by the engagement of the ends 40, 40a of the hooks 39, 39a, respectively integrated with the interlocking rod 16 with the holes 30 and 30a, respectively of the auxiliary levers 15 and 15a, respectively at the position separate from the rotating center of the interlocking rod 16.

On the other hand, if the transmitting torque to be transmitted through the interlocking rod 16 is concerned, it may be expressed in the following formula:

(Transmitting torque)=(area of surface to be transmitted)×(distance between the surface to be transmitted and coaxial center of the interlocking rod)

Therefore, the longer the distance between the surface to be transmitted and the coaxial center of the interlocking rod 16 becomes, the smaller the pressure of the surface to be transmitted. As a result, even if the area of the surface of the engaging portion between the ends 40, 40a and the holes 30, 30a is not increased, the surface to be transmitted in the engaging portion therebetween is not worn nor deformed.

In this connection, since the engaging member is engaged directly with the end of the interlocking rod in the conventional interlocking mechanism of the conventional lock recliner, the rotating angle of the interlocking rod becomes smaller than that of the manipulating lever due to the gap formed therebetween in the engaging portion therebetween, and the rotating angle of the manipulating lever at the side to be transmitted becomes further smaller than that of the side for operating the lever. Therefore, when the engaging portion is worn or deformed, it is apprehended that the engaging mechanism of the side to be operated is not released if the rotating angle of the manipulating lever at the side for operating the lever is not considerably increased.

On the other hand, it is appreciated from the foregoing discription that since the interlocking mechanism of the both-side lock recliner of the present invention is so constructed that the position of engaging the interlocking rod with the auxiliary lever rocked integrally with the manipulating lever is separated from the interlocking rod and even if the engaging portion has slightly a large gap, the rotating angles of the lever 7, the interlocking rod 16 and the lever 7a are almost the same, and even if there is slightly a large gap in the engaging portion therebetween, the rotating angle of the lever 7a with respect to the rotating angle of the lever 7, that is, the transmitting loss of the control stroke is less and the engaging portion is not so worn nor deformed, and it is not accordingly necessary to manage the engaging accuracy of the engaging portion strictly. Therefore, when the seat assembly is assembled, the engaging portion of the interlocking rod engaging structure can be readily assembled with larger gap in the engaging portion of the interlocking mechanism of the both-side lock recliner of this invention.

It is understood from the foregoing description that since the interlocking mechanism of the both-side lock recliner of the present invention is thus constructed, the manipulating force is transmitted at the position separate from the coaxial center of the interlocking rod in the interlocking mechanism of the both-side lock recliner, even if there is slightly a large gap in the engaging portion of the interlocking rod, the transmitting loss of the control stroke thereof accordingly becomes less, even if the surface of the engaging portion to be transmitted is not increased, the surface is not worn nor deformed, and parts of low dimensional accuracy such as hook, auxiliary lever and the like produced by a press work may be empolyed to still cause no transmitting loss of the control stroke in the engaging portion of the interlocking rod therein, and the surface to be transmitted in the engaging portion is not worn not deformed, the interlocking mechanism may be readily assembled, and can be inexpensively fabricated.

What is claimed is:

1. An interlocking mechanism of a both-side lock recliner for an automotive seat having a pair of right and left engaging mechanisms at both sides of the seat comprising:
   an interlocking mechanism for simultaneously controlling the lock and the release of the right and left engaging mechanisms and including right and left manipulating levers and auxiliary levers provided symmetrically at both sides of the seat, and an interlocking rod including hooks formed at both ends thereof for engaging between the auxiliary levers of both sides,
   said both-side manipulating levers rotatably secured to right and left side hinge shafts secured to right and left side lower arms, respectively at the outside of the lower arms,
   said both-side auxiliary levers and the interlocking rod rotatably secured to the right and left side hinge shafts secured to the right and left side lower arms, respectively at the inside of the lower arms,
   said both-side manipulating levers so connected as to be integrally rotated with the respective auxiliary levers through right and left side pins, respectively,
   said interlocking rod connected to both-side auxiliary levers at the hook ends provided at the positions separate from the rotating coaxial centers thereof.

2. The interlocking mechanism of the both-side lock recliner for the automotive seat according to calim 1, wherein said manipulating lever is perforated with a long hole for engaging or disengaging the engaging mechanism with or from the lower arm.

3. The interlocking mechanism of the both-side lock recliner according to claim 1, wherein the auxiliary lever is perforated with a hole for engaging the interlocking rod therewith to interlock between the auxiliary lever and the interlocking rod.

4. The interlocking mechanism of the both-side lock recliner according to claim 1, wherein right and left side latches are secured to the right and left side upper arms of the both-side lock recliner and have a plurality of arcuate teeth integrally formed therewith, right and left side poles are rockably journaled with the lower arms of the both-side lock recliner and have a plurality of teeth partly engaged with the teeth of the right and left side latches, respectively, and said auxiliary lever has a hole for engaging the teeth of the latch with the teeth of the pole.

* * * * *